United States Patent Office 3,484,246
Patented Dec. 16, 1969

3,484,246
ALKALINE CONVERSION OF GREEN TEA
Thomas Roscoe Moore, Jr., Providence, R.I., Harold Nathanial Graham, Englewood, N.J., and Martin Gurkin, Bardonia, N.Y., assignors to Thomas J. Lipton, Inc., Englewood Cliffs, N.J., a corporation of Delaware
No Drawing. Filed June 21, 1966, Ser. No. 559,062
Int. Cl. A23f 3/00
U.S. Cl. 99—76                              10 Claims

ABSTRACT OF THE DISCLOSURE

Green tea is converted to black tea by heating green tea in the presence of water and molecular oxygen at a pH above about 7.5.

---

This invention relates to tea and tea extracts and to processes for preparing the same. More particularly, the invention relates to a novel process of converting extracts of tea, such as green tea, to oxidation products thereof, such as black tea.

Green tea, as the term is employed herein includes freshly gathered tea leaves, tea leaves which have been freshly gathered and dried immediately, tea leaves which have been heat-treated before drying to inactivate the enzymes therein, and aqueous extracts of these leaves. In each instance, the green tea has undergone substantially no fermentation to the "black" state.

Black tea, on the other hand, is usually prepared by subjecting freshly picked tea leaves to a series of processing conditions including the withering and rolling of freshly harvested leaves, followed by a fermentation step (enzymic oxidation) during which the characteristic color, flavor and aroma of black tea are developed. The fermentation is stopped after a suitable period of time, the tea leaves are "fired" to inactivate the enzymes causing the fermentation and the tea is dried. The extent of fermentation varies, in commercial practice, from black to various gradations between green and black. Partially fermented teas are known as "oolong" teas. The green, oolong, and black teas each have distinctive flavor and color characteristics.

The fermentation processes are generally carried out at or near the tea growing areas and the fermentation conditions vary with local custom and climatic conditions. As a result, the fermented teas of commerce vary greatly in color and quality of flavor, depending upon the area of the world in which they are produced and the conditions of processing. A means for standardizing or at least insuring the production of a uniform quality of fermented black tea and of partially fermented varieties from a given green tea has long been sought.

It has been proposed to convert green tea to black tea by artificial means and methods, for example, by treating an extract of the green leaf with a catalyst such as potassium permanganate at a temperature as high as about 90° C. for a period of time ranging as long as about six hours, as disclosed in United States Patent 2,863,775. As far as we are aware, however, such method has never attained commercial significance.

Another method proposed for converting green tea extracts to black tea involves the use of fresh green tea leaves still containing their natural enzymes by adding such fresh leaves to an aqueous extract of green leaf thereby to convert the latter to black tea. Such procedures are disclosed and claimed in the Seltzer et al. Patent No. 2,975,000.

It is an object of the present invention to provide a process whereby black and partially converted teas can be prepared from manufactured green tea under closely controlled conditions.

Another object of the invention is to produce teas of varying degrees of color and flavor from green tea extracts.

Another object of the invention is to convert green teas at temperatures higher than those at which normal fermentations can occur.

Still another object of the invention is to effect the conversion of green teas in shorter periods of time and under conditions which produce uniform quality in the final product, even when teas from a variety of sources are used.

Another object of the invention is to produce black tea from green teas which would not normally be suitable for use in standard black tea fermentations because of low enzyme activity or the lack of certain constituents required for standard fermentation.

It is another object of the invention to bring about the conversion of green tea without the use of enzymes which become inactivated by heating.

Still another object of the invention is to develop a process of converting green tea products which readily lends itself to continuous operations.

Another object of the invention is to produce an instant black tea directly from green tea without the necessity of carrying out the additional processing steps (such as firing and drying) required for the manufacture of commercial black tea.

Another object of the invention is to obtain a process for converting green teas to obtain instant teas having the red hues found in black teas obtained by enzyme fermentation.

In accordance with the present invention, by which the foregoing objects are realized, the water-soluble constituents of green tea, which may be an aqueous extract of green tea, are heated in the presence of water and an oxygen-containing gas at a pH of at least 7.5. Under the conditions prevailing, the reaction between the oxygen and the water-soluble constituents of the green tea is allowed to progress until a desired amount of conversion of green tea to black tea has taken place. It is important to note that the conversion is non-enzymic, that is, it will take place with none of the active natural leaf enzyme present.

Although the pH of the solution is important in obtaining the objectives of the invention, other conditions are also to be considered, such as the temperature, the concentration of oxygen in the gas used for conversion, the time, agitation of the reaction system, and the concentration of the tea solids in the aqueous system. These and other features of the invention will be discussed in the following description.

The following examples illustrate how the invention may be carried out. The percentages expressed are on a weight basis unless otherwise indicated.

EXAMPLE 1

A hot water extract of commercial Japan green tea was prepared containing 4.8% soluble tea solids. The solution, which had a pH of 5.2, was made alkaline by adding, with agitation, 12.6% potassium hydroxide (tea solids basis) as a 45% solution. This increased the pH of the solution to 9.35. The temperature of the alkaline solution was raised to 85° C. and sparged with air at a rate of 16.3 liters/min./lb. (0.036 liter/min./gram) of tea solids for 20 minutes. The air was injected as small bubbles through a perforated circular tube at the bottom of the reaction vessel while the extract was being agitated at a rapid rate. After air sparging, the pH of the solution was 8.65. The temperature was lowered to 60° C. and the pH of the solution was reduced to 5.5 by batchwise addition of cation exchange resin (IR 120H$^+$, 52%

H₂O). 2.4% $CaCl_2 \cdot 2H_2O$ (tea solids basis) was then added and the insoluble material removed by centrifuging (at 6,700 times gravity) at 65° F. This is referred to as "dehazing" and is disclosed and claimed in the Schroeder Patent 2,891,866. The overall yield was 91.5% on a tea soluble solids basis.

This "converted" green tea solution, now the color of a black tea extract at a similar tea solids concentration, was concentrated under vacuum to a solids content of 45%. A quantity of maltodextrins equal to the tea solids present was added and a portion of the material was vacuum drum dried. The resulting product when dissolved in water at beverage strength, had the flavor of black tea and a color similar in redness and intensity to a regular tea beverage from a high quality commercial black tea leaf. The solubility of the powder and the clarity of the solution at beverage strength in cold, hard water were excellent.

Portions of the "converted" green tea concentrate containing maltodextrins described above, were mixed at levels of 25, 35 and 50% with 75, 65 and 50%, respectively, of a similar concentrate prepared from an extract of black tea leaf also containing maltodextrin. These concentrate mixes were vacuum drum dried to give powders having satisfactory solubility and clarity in cold, hard water and color flavor similar to a high quality beverage made from commercial black tea leaf. The color and clarity of the blended and unblended products are summarized in Table I.

TABLE I

| Tea products | Klett color | Clarity index |
| --- | --- | --- |
| 100% converted green | 229 | 7 |
| 50% converted green and 50% commercial black | 238 | 8 |
| 35% converted green and 65% commercial black | 240 | 11.5 |
| 25% converted green and 75% commercial black | 240 | 9 |
| 100% commercial black | 241 | 7 |

Color was measured in a Klett Colorimeter by preparing a 0.14% solution of instant tea (0.07% tea solids) in a buffer solution (0.944% $NaH_2PO_4 \cdot H_2O$; 0.858% $Na_2HPO_4 \cdot 7H_2O$) at pH 6.4 and at 25° C. A 420 millimicron light filter was used. The instrument is calibrated against a dichromate standard.

Clarity was measured in a 0.7% solution of instant tea (0.35% tea solids) in synthetic hard water, at 13° C., using a Klett Colorimeter with a 660 millimicron light filter. The synthetic hard water contained 0.0179% $CaCl_2 \cdot 2H_2O$, 0.015% $MgSO_4$ and 0.0062% $NaHCO_3$. After the measurement was made, the sample was centrifuged at 2,000 times gravity and the absorbance was determined using the same filter. The difference between the two readings in Klett units is the clarity index. In every case the clarity values of solutions made up with soft water are substantially lower (i.e., clearer) than those made with hard water.

EXAMPLE 2

Thirteen pounds of commercial green tea siftings from Japan were extracted to yield an extract having a 4.8% soluble tea solids and a pH of 5.2. This extract at 40° C. was transferred to an open steam jacketed kettle equipped with a perforated circular tube at the bottom for gas sparging. The extract was made alkaline by the addition of 9.3% potassium hydroxide (as a 45% solution) based on the tea solids present, thereby to increase its pH to 9.2. The temperature of the extract was then raised to 70° C. and oxygen sparged through the extract solution at a rate of 20 liters/min./lb. (0.044 liter/min./gram) of tea solids for 20 minutes. Sparging was then discontinued and the pH of the solution (which was 7.2 after oxygen treatment) was reduced to 5.5 by the batchwise addition of 360 grams of cation exchange resin (IR 120 H⁺, 63% H₂O). The resin was then removed by screening and the extract, now the color of black tea, treated with 2.4% $CaCl_2 \cdot 2H_2O$ (tea solids basis), as described in Example 1, to precipitate a certain fraction of the tea solids which would ordinarily form a haze hard water. The haze precipitate was removed by centrifuging the treated extract at 60° F. The overall yield of soluble tea solids was 90.5%. A portion of this supernatant was concentrated under vacuum to a solids content of 45%, a quantity of maltodextrins equal to the weight of the tea solids added, and this solution was vacuum drum dried. The resulting powder was very soluble in cold (55° F.), hard water and had a desirable red hue and a flavor at beverage strength (0.7 gram/100 ml.) similar to a regular tea beverage made from black tea leaf. Portions of the above converted green tea concentrate containing maltodextrins were mixed at levels of 25, 35 and 50% with a concentrate made from commercial black tea leaf, as in Example 1. These mixtures were vacuum drum dried and the powders tested by dissolving in cold (55° F.), hard water at a beverage concentration of 0.7%. The solubility of the powders and the clarity of the solutions were excellent. The products containing the converted green tea solids possessed a tea color similar to a high quality black tea beverage and a flavor indistinguishable from the instant product prepared entirely from commercial black tea leaf. The color and clarity of the blended and unblended products are summarized in Table II.

TABLE II

| Tea products | Klett color | Clarity index |
| --- | --- | --- |
| 100% converted green | 275 | 15 |
| 50% converted green and 50% commercial black | 256 | 7.5 |
| 35% converted green and 65% commercial black | 254 | 24 |
| 25% converted green and 75% commercial black | 250 | 22 |
| 100% commercial black | 240 | 20.5 |

EXAMPLE 3

In order to investigate the effect of pH on the conversion of green tea extracts with oxygen, a 5.0% solution of green tea solids was prepared from a freeze-dried extract of green tea leaf. The pH of the solution was then adjusted to the desired level by adding appropriate amounts of 4N·KOH. The solutions were heated to 70° C. and then sparged with 0.13 liter of oxygen per minute per gram of tea solids. Sparging with oxygen was continued for 15 minutes at 70° C. The solutions were then adjusted to pH 5.0 at 70° C. with cation exchange resin, after which they were dehazed with calcium chloride as in the preceding examples. The supernatant solutions were concentrated, maltodextrins were added and the resulting solutions were drum-dried as in the preceding examples. The results are presented in Table III.

TABLE III

| Percent KOH added | pH After KOH addition | Klett color of product |
| --- | --- | --- |
| 0 | 5.5 | 166 |
| 4.2 | 8.0 | 194 |
| 10.4 | 9.0 | 231 |
| 15.8 | 10.0 | 472 |

When the pH is increased from 9.0 to 10.0 the Klett color value is increased over 100%. It is apparent, therefore, that the pH to which the tea solution is adjusted prior to oxygen treatment is a major factor affecting the color of the final product.

EXAMPLE 4

The effect of pH on conversion of green tea by alkaline oxidation with air is demonstrated in this example. Five percent aqueous solutions of a freeze-dried extract of Japanese green tea siftings were made alkaline with various amounts of KOH. These solutions were air-sparged for 20 minutes at 70° or 85° C., while another was heated but not air-sparged. After treatment, the alkaline solutions were readjusted to pH 5.5 with cation exchange resin, dehazed and freeze-dried. The results are presented in Table IV.

TABLE IV

| Air flow | Percent KOH added initially | pH After KOH addition | pH After treatment | Reaction temp., °C. | Klett color of product |
|---|---|---|---|---|---|
| None | 9.5 | 8.5 | 8.6 | 85 | 130 |
| 0.036 liter per minute per gram. | 4.5 | 7.3 | 7.3 | 70 | 127 |
| | 6.5 | 7.7 | 7.7 | 70 | 150 |
| | 9.5 | 8.5 | 7.3 | 85 | 348 |
| | 12.5 | 9.2 | 8.1 | 70 | 580 |

Total yields ranged from about 87 to 95%. When the pH of the tea solution before treatment with air was increased, the color of the product increased markedly. The products resulting from conversion at the higher alkali levels (9.5 and 12.5%) had a desirable and enhanced red hue.

The low color of the product obtained when air sparging was omitted indicates the importance of the presence of oxygen in the conversion of green tea. To further demonstrate the effect of oxygen on conversion, an experiment was conducted whereby a 5% solution of extract solids from Japanese green tea siftings was adjusted to a pH of 8.8 by the addition of 9.5% KOH and heated to 100° C. for 40 minutes with nitrogen blanketing and sparging to insure complete exclusion of oxygen. The pH of the solution decreased to only 8.5 during the reaction. It was then adjusted to pH 5.5 with cation exchange resin and the resulting solution dehazed and freeze-dried. The color of the product indicated that essentially no color conversion occurred during this treatment; nor was there any significant alteration of the green tea flavor and taste.

From the standpoint of economy, air is generally preferred as the oxidizing agent, however, gases containing more or less oxygen may be used. Generally, the concentration of oxygen in the tea solution is important in effecting conversion. Thus, the factors and parameters involved in mass transfer between gas and liquid also affect the rate of conversion, such as oxygen concentration in the sparging gas, size of the gas bubbles, degree of turbulence, etc.

EXAMPLE 5

The effect of varying the time of treatment with air is demonstrated in this example. An alkaline 5% solution of Japanese green tea siftings (Batch I) was sparged 85° C. with air at the rate of 0.036 liter/min./gram. At preselected intervals aliquot portion were removed and the air flow was adjusted to maintain the original ratio of air to tea solids in solution. Each aliquot was processed in the manner described in the preceding examples. Measurments were made on color (Klett 420 mμ) and "Tristimulus Color." The method for measuring tristimulus color data for tea solutions was according to the standard procedure described in the Instruction Manual for the Model V Colormaster (Manufacturing Engineering & Equipment Corporation, Warrington, Pa.). The tristimulus measurements were made on 0.35% tea solutions prepared in a 5% acetone phosphate buffer (pH 6.4); the concentration is expressed on a tea solids basis. The solutions were filtered through glass wool to remove any undissolved particles prior to measurement. The "a" values from the latter measurement, which is a measure of redness, and the Klett color values are presented in Table V:

TABLE V

| Reaction time | Klett color | "a" Value |
|---|---|---|
| 5 | 170 | 15.0 |
| 10 | 214 | 31.8 |
| 15 | 268 | 38.0 |
| 20 | 315 | 52.6 |
| 30 | 315 | 61.6 |
| 60 | 435 | 74.0 |
| 90 | 510 | 96.6 |

It will be observed that both the "a" value and the Klett color (420 mμ) increased with the time of treatment. It is apparent, therefore, that reaction time is an important factor in controlling the degree of conversion and the color and hue of the final product. If desired shorter reaction times may be used to obtain an incompletely converted tea product, for example a product comparable to the oolong varieties.

EXAMPLE 6

In this example, the effect of varying the pH is again demonstrated, using teas from a number of sources. Several aliquots of 5% green tea solutions were prepared, from each of two batches of Japanese green tea siftings (Batches I and II) and from Formosa green tea, and were heated to 85° C. and various quantities of alkali were added to each aliquot (6.5–11.5% KOH). The solutions were air-sparged at 0.036 liter/min./gram for 20 minutes and were subsequently processed as described above. The results are presented in Table VI.

TABLE VI

| Percent KOH | pH Initial | pH Final | Klett Color | "a" Value |
|---|---|---|---|---|
| Japan Green—I | | | | |
| 9.5 | 7.9 | 6.8 | 292 | 28.0 |
| 10.5 | 8.1 | 7.0 | 315 | 31.0 |
| 11.5 | 8.4 | 7.1 | 380 | 37.8 |
| Japan Green—II | | | | |
| 6.5 | 7.4 | 6.2 | 193 | 12.9 |
| 7.5 | 7.7 | 6.5 | 230 | 17.9 |
| 8.5 | 7.9 | 6.8 | 238 | 19.1 |
| 9.5 | 7.9 | 6.9 | 222 | 19.0 |
| 10.5 | 8.2 | 7.0 | 284 | 26.5 |
| 11.5 | 8.5 | 7.4 | 320 | 35.6 |
| Formosa Green | | | | |
| 9.5 | 9.3 | 7.4 | 240 | 20.6 |
| 10.5 | 9.3 | 7.5 | 264 | 33.2 |
| 11.5 | 9.3 | 7.6 | 272 | 36.8 |

As the amount of alkali was increased, redness and intensity also increased but at a slightly different rate for each variety of green tea. It follows that the pH of the treatment may be adjusted to yield a produce having the desire color and hue utilizing green teas from different sources.

The effect of increasing the time of treatment at lower pH was investigated and it was found that a pH of at least about 7.5, and preferably above 8.0 is necessary to produce a practical degree of conversion within a commercially feasible time.

In producing any product having particularly desired properties, the conditions of pH and time of treatment are interdependent, and will also be affected by other conditions, such as the type of tea used, the concentration of the tea solids in the solution, the temperature, etc., as shown subsequently. These conditions can, however, be appropriately selected and controlled by those skilled in the art to produce the desired product.

Still other factors to be taken into consideration in treating any particular type of material to produce a product having desired properties are the concentration of tea solids in solution and the temperature, the effects of which are demonstrated in the following examples.

EXAMPLE 7

This example illustrates the effect of varying the concentration of tea solids in soltuion. A freeze-dried extract of Japan green tea siftings was used to prepare three 500 gram aliquots of green tea solutions at 5, 10 and 20% concentrations having a pH of 5.4. Each aliquot was heated to 85° C. and 12.5% (w./w.) KOH was added, thereby increasing the pH to 9.0. Temperature was maintained at 85° C. while each alkaline solution was air-sparged for 20 minutes at 0.9 liter/min. The treated solutions were pH adjusted to 5.5 with cation exchange resin. The 10 and 20% solutions which had been treated were split into two portions. One portion was diluted to 5% solids with distilled water and dehazed. The treated 5% green tea solution was also dehazed in a similar manner. The other portions were dehazed at the original concentrations of 10 and 20%, respectively. All the dehazed materials were freeze-dried. The results are presented in Table VII.

TABLE VII

|  | Concentration during treatment | | | | |
| --- | --- | --- | --- | --- | --- |
| pH after treatment | 5% 7.8 | 10% 8.1 | | 20% 8.2 | |
| Concentration of solution during dehazing, percent | 5 | 5 | 10 | 5 | 20 |
| Percent loss due to dehazing | 1.7 | 6.5 | 13.4 | 6.2 | 17.7 |
| Klett color (420 mµ) | 335 | 335 | 315 | 400 | 292 |
| "a" Value | 36.0 | 37.2 | 31.0 | 39.2 | 29.2 |

The products dehazed at 5% had similar "a" values.

The material dehazed at 10 and 20% had elevated cream-haze losses due to the effect of the higher concentration. These higher cream-haze losses were reflected in the lower red and intensity values ("a" and Klett values, respectively) of the final products since the cream contains a higher portion of the color. The losses due to dehazing at 5% solids were within acceptable limits. Higher cream losses when dehazing at higher concentrations can be overcome by decreaming at higher temperatures. This example demonstrates that conversion can be carried out at higher concentrations, thereby affording obvious economic and commercial advantages. Generally, preferred concentrations of tea solids in the initial material are in the range 2–30%.

EXAMPLE 8

This example illustrates the effect of varying the temperature of treatment. Five percent solutions of Japanese green tea siftings were heated to and maintained at selected reaction temperatures during the reaction period. 12.5% KOH was added, the alkaline solutions were air-sparged at 0.036 liter/min./gram for 20 minutes and the products isolated by standard procedures. The results appear in Table VIII.

TABLE VIII

| Temperature, °C. | pH initial | pH final | Klett color |
| --- | --- | --- | --- |
| 25 | 9.1 | 8.3 | 286 |
| 40 | 9.1 | 8.2 | 238 |
| 55 | 9.1 | 8.1 | 266 |
| 70 | 9.1 | 7.4 | 324 |
| 85 | 9.1 | 7.4 | 303 |
| 100 | 9.1 | 7.8 | 309 |

Visually, the 25° product was green-black while the 40°, 55° and 70° products were orange to orange-red; the 85° product was red and the 100° product very red and light. It is apparent that the temperature in conjunction with the time and pH of the air-conversion process may be adjusted to give almost any desired product. Preferred temperatures are within the range 50 to 130° C. for conversion within a practical period of time. Above 100° C. the system must, of course, be maintained under pressure.

EXAMPLE 9

The following experiments were conducted to determine the effect of pressure on reaction rates and products at a conversion temperature above 100° C. Aliquots (1 kg.) of a 5% w./w. green tea solution containing 12.5% KOH were placed in a pressure vessel and heated to 115° C. The initial pH was 5.4±0.2 and KOH addition increased it to 9.1±0.1. The agitated reaction solutions were subjected to either pressurized air (200 p.s.i.g.) or air-sparging (25 p.s.i.g.) at 0.036 liter/min./gram. At the completion of the reaction, the solutions were adjusted to pH 5.5 with cation exchange resin, dehazed and freeze-dried.

In this particular group of experiments the time required for heating the solution to 115° C. was about 2 hours. To determine the effect of this heating period on product characteristics, portions of the alkaline green tea solutions containing some dissolved oxygen were heated and agitated in a similar fashion in a closed system at about 25 p.s.i.g. (due to water vapor pressure) without air-sparging. These solutions were also pH adjusted, dehazed and freeze dried as above. The results appear in Table IX.

TABLE IX

| Reactions Pressure | 25 p.s.i.g. | | | | | | | | 200 p.s.i.g. | |
| --- | --- | --- | --- | --- | --- | --- | --- | --- | --- | --- |
| Reaction time (min.) | 2 | 2 | 5 | 5 | 10 | 10 | 20 | 20 | 2 | 20 |
| Air-sparged | Yes | No | Yes | No | Yes | No | Yes | No | No | No |
| pH after treatment | 7.7 | 7.8 | 7.5 | 7.9 | 7.4 | 7.9 | 7.4 | 7.8 | 6.8 | 6.4 |
| Process yields (percent) | 90.3 | 89.5 | 88.3 | 89.7 | 88.6 | 90.3 | 88.8 | 90.4 | 92.8 | 100.0 |
| Color: | | | | | | | | | | |
| Klett (420 mµ) | 193 | 145 | 254 | 134 | 350 | 133 | 294 | 154 | 312 | 570 |
| "a" | 22.3 | 14.2 | 35.3 | 11.0 | 41.2 | 9.6 | 36.8 | 14.5 | 42.2 | 88.0 |

The increased amount of dissolved oxygen obtained by air-sparging at 25 p.s.i.g. markedly reduced the reaction time required to obtain "a" values of 35–40. Overall color intensities (Klett color) at these "a" values were similar to those usually obtained under the conditions of air conversion at atmospheric pressure and lower temperatures. Those samples which were heated under similar conditions without air-sparging were converted but to significantly lighter tea colors than the corresponding samples sparged with air.

Reaction at 200 p.s.i.g. for 2 minutes yielded a product with acceptable Klett and "a" values and good yields. With a reaction time of 20 minutes at this pressure, yields were good, but the color was too dark. However, this material may be used for blending with other teas.

The coordinate effect of pH and time of reaction in producing a desired degree of conversion of green tea has been previously noted. From the additional examples and description given it will be appreciated that temperature, pressure, concentration of oxygen and concentration of tea solids also have a bearing on the conditions which are desirable or necessary to produce a converted green tea having the desired properties. Thus, higher initial pH's, higher temperatures or longer times of reaction generally produce a greater degree of conversion to a black tea product. Higher concentrations of oxygen or higher pressures produce more rapid conversion, or conversion at lower temperature or in a shorter time. When the process is carried out using higher concentrations of tea solids, then longer times of conversion, higher temperatures, greater pressures (or possibly all three conditions) or other conditions discussed herein may be required to effect a desired degree of conversion.

The source of the green tea used as starting material is a factor to consider in selecting the conditions for conversion. One green tea may require a somewhat different combination of pH, pressure, temperature, and time, etc. than other green tea. A partially fermented tea, such as an "oolong" tea may be used as a starting material. It is also possible to blend teas from different sources in order to promote uniformity of the product obtained.

If desired, the conversion may be carried out in the presence of green leaf to effect a single stage extraction and conversion to give an infusion of black tea solids. This extract can then be separated from the leaf, neutralized and processed to a black instant tea as described above.

Smaller amounts of an alkaline solution may be added to a dried green leaf so that the majority of the alkaline solution is absorbed by the leaf. This wetted leaf can then be converted in the presence of an oxygen containing gas at normal or elevated temperatures and then dried to give a black leaf which can be used in tea bags or as bulk tea. Under certain conditions, small amounts of a neutralizing agent may be added after conversion and before or during drying to reduce the pH of the infusion obtained from the converted leaf.

Instead of potassium hydroxide other edible alkalies may be used for increasing the pH for conversion.

The ion exchange resins, as indicated above, are preferred for reducing the pH of the converted tea solution, because they are easily separated from the solution. Electrodialysis techniques, if desired, are also suitable. Other food grade neutralizing agents may be used, such as well-know food grade acids.

We claim:

1. The process of converting green tea to black tea which comprises heating an aqueous solution of solids of said green tea at a pH above about 7.5 in the presence of molecular oxygen, and allowing said green tea solution to react with said oxygen for a period of time sufficent to oxidize said green tea solids thereby producing black tea.

2. The process of converting constituents of green tea to a black tea which comprises heating said constituents in the presence of water and molecular oxygen at a pH above about 7.5, and allowing said constituents to react with said oxygen for a period of time sufficient to convert said constituents to constituents of black tea.

3. The process of claim 2 in which the pH is above 8.0.

4. The process of ciaim 3 in which the temperature is between about 50° C. and 130° C.

5. The process of claim 3 in which the pH of the converted green tea solution is adjusted to pH below 7.0.

6. The process of claim 2 in which the oxygen is supplied by air.

7. The process of claim 2 in which the process is carried out in the presence of tea leaves.

8. The process of claim 1 in which the converted green tea is dried to produce an instant tea.

9. The process of converting constituents of partially fermented tea to a black tea which comprises heating said constituents in the presence of water and molecular oxygen at a temperature above about 50° C. and at pH above about 7.5, and allowing said constituents to react with said oxygen for a period of time sufficient to convert said constituents to constituents of black tea.

10. The process of converting constituents of green tea to a product equivalent to partially fermented tea, which comprises heating said constituents in the presence of water and molecular oxygen at a temperature above about 50° C. and at pH above about 7.5, and allowing said constituents to react with said oxygen for a period of time sufficient to convert said constituents to constituents of partially fermented tea.

References Cited
UNITED STATES PATENTS

| | | | |
|---|---|---|---|
| 3,163,539 | 12/1946 | Barch | 99—77 |
| 2,975,057 | 3/1961 | Seltzer et al. | 99—77 |
| 3,369,906 | 2/1968 | Chen | 99—77 |

RAYMOND N. JONES, Primary Examiner

J. R. HOFFMAN, Assistant Examiner

U.S. Cl. X.R.

99—77